June 23, 1964 G. R. STIBITZ 3,138,749
INCREMENTAL FEED MECHANISMS
Filed March 5, 1962 3 Sheets-Sheet 1

INVENTOR
G. R. Stibitz

June 23, 1964 G. R. STIBITZ 3,138,749
INCREMENTAL FEED MECHANISMS
Filed March 5, 1962 3 Sheets-Sheet 2

INVENTOR
G. R. Stibitz

June 23, 1964 G. R. STIBITZ 3,138,749
INCREMENTAL FEED MECHANISMS

Filed March 5, 1962 3 Sheets-Sheet 3

INVENTOR
G. R. Stibitz ns patent no. 3,138,749,

United States Patent Office
3,138,749
Patented June 23, 1964

3,138,749
INCREMENTAL FEED MECHANISMS
George R. Stibitz, Underhill, Vt.
(R.F.D., Cambridge, Vt.)
Filed Mar. 5, 1962, Ser. No. 177,953
16 Claims. (Cl. 318—135)

This invention relates to feed mechanisms which are capable of providing precisely controlled, microscopically small motions; and has for its object the provision of simple, easily controlled, compact and inexpensive means for attaining and for accumulating said small incremental motions.

This said means is distinguished in its simplicity, lower cost and compactness of construction, from the known means for accumulating and controlling small motions in the machine tool industry for example, where a fluid-pressure operated mechanism is used for producing driving forces for incremental displacements, as described in U.S. Patent No. 2,843,975 issued to L. J. Kamm.

My invention has numerous objects. Among the more important objects are the following:

(1) To provide means in which the magnetostrictive effect or other phenomena leading to expansion or deflection, is utilized in cooperation with frictional restraints to produce cumulative incremental motions in the micro-inch range.

(2) To provide elements capable of linear expansion or deflection under external control.

(3) To provide means to control the application of the magnetostrictive effect, or other phenomena leading to expansion or deflection.

(4) To provide means for predetermining the extent of each incremental motion.

(5) To provide means to move linearly, by small, precisely controlled increments, such objects as cutting or grinding tools.

(6) To provide means, in combination with other like means to move in any direction in space, by small, precisely controlled increments, such objects as microtools used for manipulation and dissection of objects being observed microscopically.

(7) To provide means by which the magnetostrictive effect or other phenomena leading to expansion or deflection, can be applied to bimetallic elements, and in cooperation with frictional restraints can produce cumulative incremental motions in the microinch range.

The essential feature of my invention is the arrangement of a multiplicity of frictional connections acting between a rigid element, and any other elements capable of small independent motions, in which arrangement the sequential incremental motions of the second-named elements are accumulated by the action of the frictional connections.

In my invention incremental motions are accumulated through application of certain well-known characteristics of frictional forces. One such characteristic is the essential constancy of force, independent of speed. Thus, if more than two identical frictional restraints act frictionally on a rigid body, all but one of the restraints acting in one direction, and the remaining one in the opposite direction, then the rigid body will move with the majority of the restraints.

In one embodiment of my invention I use a rigid motor bar capable of being moved in small, linear, uninterrupted motion when magnetic fields are applied to expandable magnetostrictive elements which are connected to slidable frictional restraints. These frictional restraints, spaced at intervals, when driven in reciprocating motion, will cause the motor bar to move with accumulated motion.

In another embodiment of my invention I use bimetallic magnetostrictive elements set in a base. These elements are capable of deflection, and to them I apply magnetic fields in such a sequential manner as to produce small, linear, incremental motions in associated frictional restraints which cause a cumulative motion of the motor bar.

In a third embodiment of my invention, I use a rigid motor bar capable of being moved in small, linear uninterrupted motion when magnetic fields are applied sequentially to expandable electromagnetic elements which are connected to slidable frictional restraints. Said frictional restraints, spaced at intervals, when driven in reciprocating motion, will cause the motor bar to move with the accumulated motion.

In a fourth embodiment of my invention I use an expansible magnetostrictive motor bar slidable through fixed frictional restraints, cooperating in the manner already described.

Although these four embodiments will be described hereinafter in greater detail, it will be understood that they are illustrative only and that my invention may have many other forms.

The invention may be more fully understood by reference to the drawing which contains the following figures:

FIG. 1b is a section view of one of the units seen in FIG. 1a.

FIG. 3a is a view of the second embodiment of my invention which utilizes bimetallic elements to move frictional restraints.

FIG. 3b is a graph showing displacements of the embodiment of FIG. 3a.

FIG. 1a is an illustration of one general mechanism I propose to use in order to advance a tool in an uninterrupted manner, through arbitrary small distances.

Figure 1A:
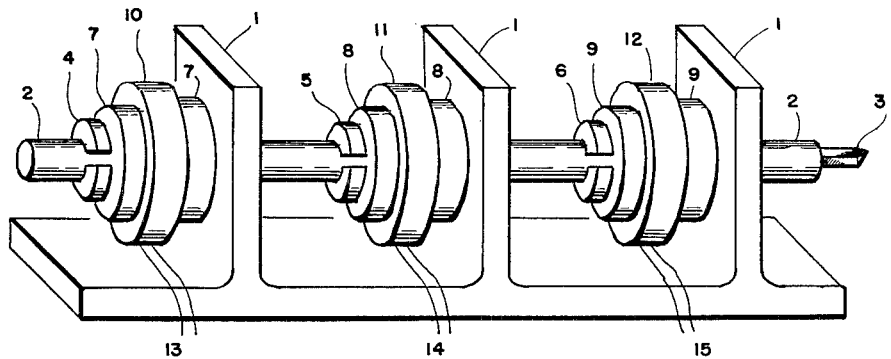
FIG. 1a is a view of one embodiment of my invention which utilizes magnetostrictive elements.
Figure 1B:
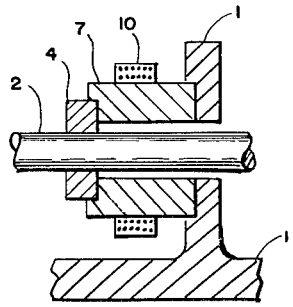

Referring to FIG. 1a, a base 1 is shown, through the upright portions of which a rigid motor bar 2—2 passes freely in order to move tool 3. Attached to the upright portions of base 1 are magnetostrictive cylinders, 7—7, 8—8 and 9—9, and electromagnetic coils 10, 11 and 12 (with leads 13, 14 and 15) are attached to said cylinders. Also attached to the magnetostrictive cylinders 7, 8 and 9 are frictional restraints, or couplers, 4, 5 and 6. See FIG. 1b for a sectional view of one unit consisting of base 1, motor bar 2, frictional restraint 4, magnetostrictive cylinder 7 and coil 10.

Figure 2A:
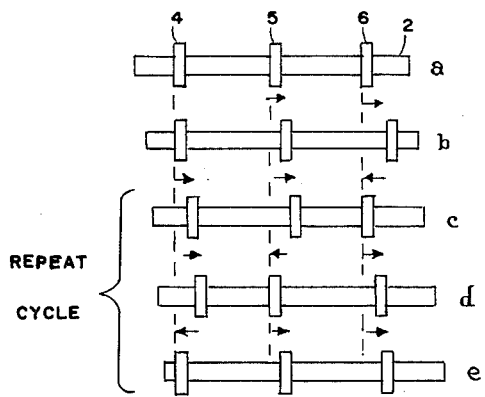
FIG. 2a illustrates the sequence of events as the magnetic fields are applied to advance the motor bar.

In this figure, let it be assumed for the purpose of illustration, that frictional restraints 4, 5 and 6 are in a "normal" position before starting an operation. Also, see step a of FIG. 2a. As a magnetic field is applied via leads 14 and 15 to magnetostrictive cylinders 8 and 9, frictional restraints 5 and 6 will be caused to advance slightly to the right, carrying the motor bar 2 with them. See step *b* of FIG. 2*a*.

As the current is decreased in lead 15, and increased via leads 13 and 14, frictional restraint 6 is caused to move slightly to the left, and frictional restraints 4 and 5 will be caused to advance slightly to the right, carrying the motor bar 2 with them. See step *c* in FIG. 2*a*.

As the current is then decreased in lead 14 associated with frictional restraint 5, and increased in leads 13 and 15 associated with frictional restraints 4 and 6, frictional restraint 5 is caused to move slightly to the left, and frictional restraints 4 and 6 will be caused to advance slightly to the right, carrying the motor bar2 with them. See step *d* in FIG. 2*a*.

As the current is then decreased in lead 13 associated with frictional restraint 4, and increased in leads 14 and 15 associated with frictional restraints 5 and 6, frictional restraint 4 will be caused to move slightly to the left, and frictional restraints 5 and 6 will be caused to advance slightly to the right, carrying the motor bar 2 with them.

The cycle just described in detail of magnetic fields being increased and reduced in overlapping sequence is capable of being repeated the number of times required in order to move tool 3 the required distance. It will be clear to anyone skilled in the art that this same cycle may be reversed in order to retract motor bar 2.

Figure 9:
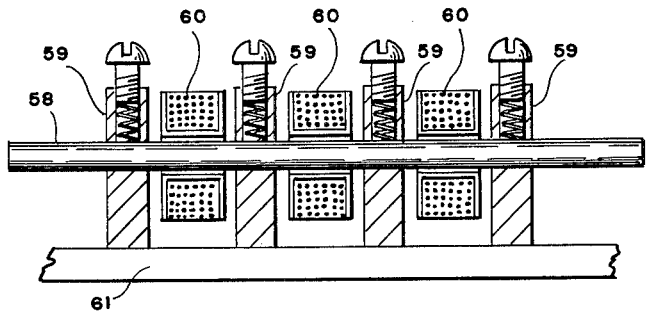
FIGURE 9 shows an alternative method of producing relative displacement wherein the motor bar is magnetostrictive.

The same sequence of relative displacements between the motor bar and frictional restraints may clearly be obtained by constructing the motor bar of magnetostrictive material and fixing the frictional restraints with respect to the base, as shown in FIGURE 9. In this instance, the magnetizing coils are placed about the segments of the motor bar between the frictional restraints.

Figure 3:
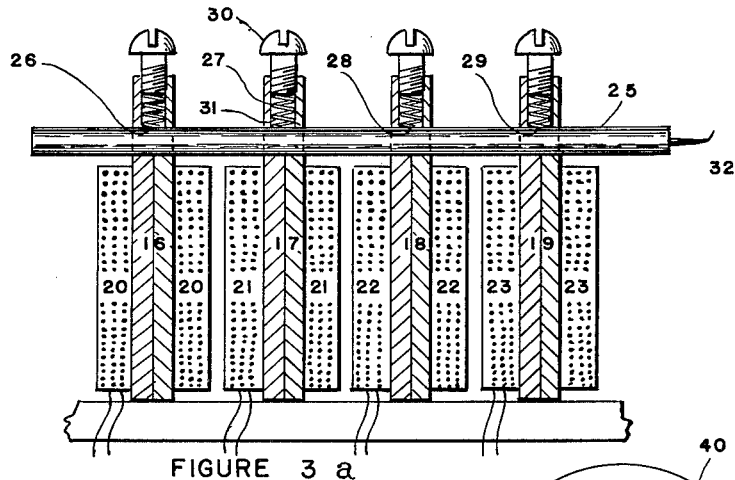
Figure 3:
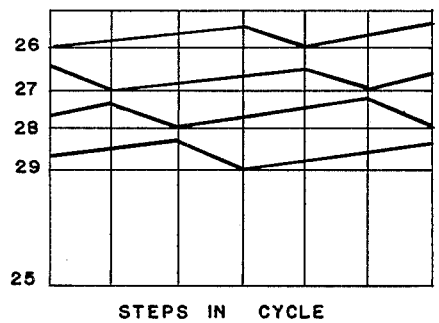

The construction of this embodiment of my invention is generally similar to that shown in FIGURE 3*a*, except that the friction constraints 59—59, FIGURE, 9 are rigid and immovably attached to base 61. Motor bar 58 is constructed of magnetostrictive material, such as nickel, and coils 60—60 are slidably mounted on motor bar 58. Selective energization of magnets 60—60 causes expansion or contraction of segments of motor bar 58, producing relative motion between frictional constraints 59—59 and motor bar 58 in a manner similar to that already described in connection with FIGURE 3*a*.

It will also be clear to anyone skilled in the art that a larger number of units consisting of magnetostrictive cylinders, coils and frictional restraints can be utilized in this embodiment, and that I have limited the number shown to three for the purposes of illustration only.

In my second embodiment I have chosen to use bimetallic elements which have the property of deflecting from their normal shape upon the application of a magnetic field, and returning to their normal shape when the magnetic field is decreased.

This second embodiment is illustrated in FIG. 3*a*. Referring to that figure; on base 24 are to be seen bimetallic elements 16, 17, 18 and 19, and electromagnetic coils 20, 21, 22 and 23. Resting on the bimetallic elements and coils is a rigid motor bar 25. Positioned slidably along motor bar 25 are frictional restraints 26, 27, 28 and 29. The details of construction of said frictional restraints are illustrated at frictional restraint 26, where friction screw 30 and friction spring 31 are shown.

This is another illustration of the principles I propose to use in my invention in order to advance a tool a certain, small, controlled distance in an uninterrupted manner.

In FIG. 3*a*, as magnetic fields are applied to bimetallic elements 16, 18 and 19, via coils 20, 22 and 23, the field is reduced on element 17 causing said element to return to its normal shape, which return causes frictional restraint 27 (produced by friction screw 30 and spring 31) to be retracted slightly to the left. At the same time, elements 16, 18 and 19 are deflected by the increase of magnetic fields, causing frictional restraints 26, 28 and 29 to advance slightly, carrying motor bar 25 with them. The action of the device during this and subsequent steps is illustrated in FIG. 3*b*.

In the next step, as magnetic fields are increased on elements 16, 17 and 19, via their associated coils, the field is reduced on element 18, causing said element to return to its normal shape, which return causes frictional restraint 28 to be retracted slightly to the left. At the same time, as elements 16, 17 and 19 are deflected, frictional restraints 26, 27 and 29 are caused to advance slightly, carrying motor bar 25 with them.

Next, as magnetic fields are increased on elements 16, 17 and 18, via their associated coils, the field is reduced on element 19 and its normal shape is resumed, which causes frictional restraint 29 to be retracted slightly to the left. Elements 16, 17 and 18, being deflected, cause frictional restraints 26, 27 and 28 to advance slightly to the right, carrying motor bar 25 with them.

Following, as magnetic fields are increased on elements 17, 18 and 19, via their associated coils, the field is reduced on element 16, and frictional restraint 26 is retracted slightly to the left. Elements 17, 18 and 19 are deflected and thus, frictional restraints 27, 28 and 29 advance slightly to the right, carrying motor bar 25 with them.

The cycle just described in detail, of magnetic fields being increased and reduced in overlapping sequence, is capable of being repeated the number of times required in order to move microtool 32 any desired distance. It will be clear to anyone skilled in the art that the same cycle may be reversed in order to retract motor bar 25.

It will also be clear to anyone skilled in the art that a larger number of units consisting of bimetallic elements, coils and frictional restraints can be utilized in this embodiment, and that I have limited the number shown to four for the purposes of illustration only.

In the third embodiment of my invention I have chosen to use electromagnetic elements which have the property of expanding upon the application of magnetic fields and contracting when the fields are reduced.

Figure 4:
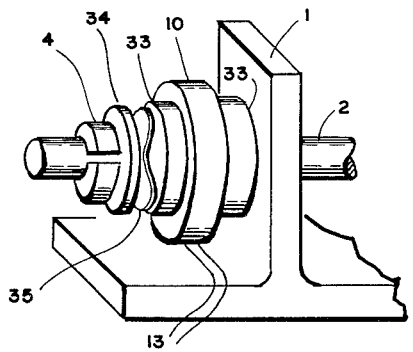
FIG. 4 is a view of the third embodiment of my invention which utilizes electromagnetic elements to move frictional restraints.

Referring to FIG. 4, wherein is shown one unit of a multiplicity arranged as in FIG. 1*a*, passing freely through an upright base 1 is seen motor bar 2. Attached to the upright of base 1 is a magnetic core 33, wound with coil 10. Spring 35 is contiguous to core 33, and armature 34. Frictional restraint 4 is attached to armature 34. Lead 13 will transmit current to coil 10 (as in FIG. 1*a*).

In FIG. 4, as a magnetic field is applied via lead 13 to soil 10, armature 34 is attracted to the electromagnet (core 33 and coil 10) with a force proportional to the amount of current applied. The motion of armature 34 will cause frictional restraint 4 to move slightly. When the current is reduced, spring 35 will cause armature 34 and frictional restraint 4 to return to their former position.

The incremental motions of the frictional restraints will be those of moving to the left or right, as magnetic fields are increased and decreased in a sequential and overlapping manner. This operation proceeds just as described for my first embodiment, which utilizes magnetostrictive properties to move the frictional restraints.

Figure 5:
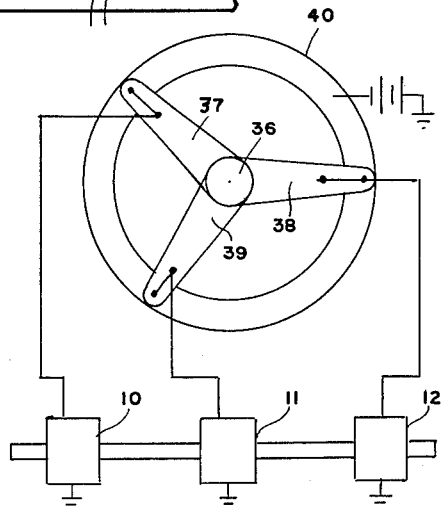
FIG. 5 shows the method I propose for controlling any appropriate embodiment of my invention.

I propose to control the application of magnetic fields to the embodiments shown, or any appropriate embodiment of my invention, by utilizing the conventional control device shown in FIG. 5.

In this figure I show a rotary potentiometer with control shaft 36, brush arms 37, 38 and 39, potentiometer winding 40, battery 41 and the coils 10, 11 and 12, which coils are seen also on the embodiment shown in FIG. 1*a*.

FIG. 5 shows a tapped potentiometer of the conventional type, in which taps are provided at two points, one-third of a revolution apart. I show three brush arms 37, 38 and 39 electrically connected to coils 10, 11 and 12 (see FIG. 1*a*), but I limit the number of brush arms to three for illustrative purposes only. There would necessarily be one arm associated with each coil of each magnetostrictive unit.

It will be clear to anyone skilled in the art, that as each brush arm is in contact with the tap at which battery 41 is connected, the full battery voltage is transmitted to the coil associated with that arm, and the voltage gradually decreases to zero as the arm sweeps to the ground tap, one-third of a revolution later. During the subsequent two-thirds of a revolution of said arm, the voltage is increasing to full again.

Figure 2B:
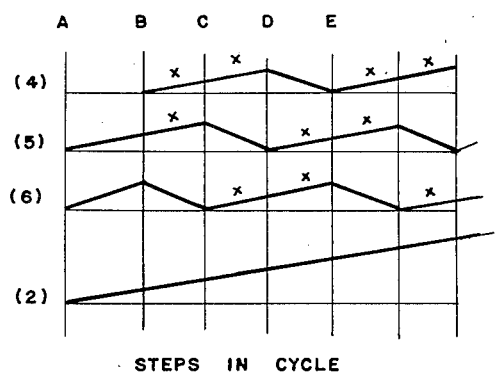
FIG. 2b illustrates the same motions in graphic form.

To a close approximation, displacement of any one of the magnetostrictive elements in FIG. 1a is proportional to the magnetic flux through it. Said flux in turn is proportional to the current through its associated coil. Said current is approximately proportional to the voltage picked up by the corresponding arm of the potentiometer. The motions produced by the displacements are, therefore, similar to those illustrated in FIG. 2b.

Figure 6:
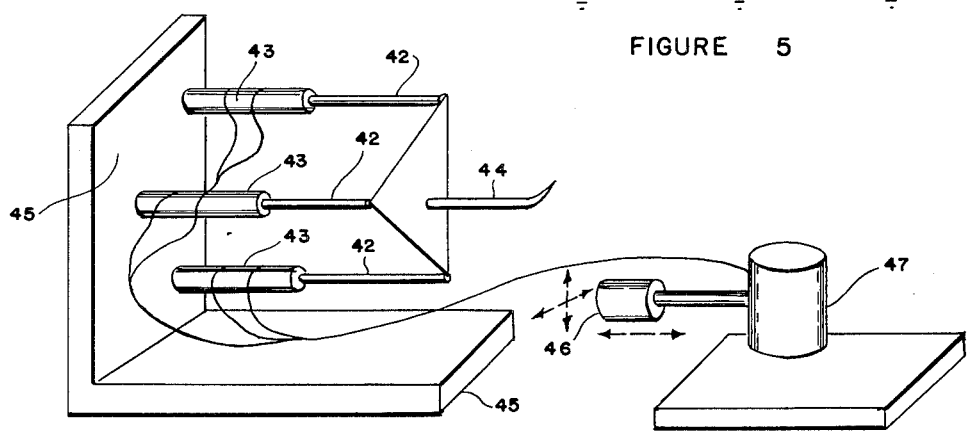
FIG. 6 illustrates an application of my invention to the motion of a tool in space.

FIG. 6 illustrates an application of any embodiment of my invention by demonstrating how a microtool on a micromanipulator, a device for manipulating objects under a microscope, could be moved in space.

Referring to FIG. 6, I show motor bars 42, 42, 42, devices constructed according to my invention, 43, 43, 43, a microtool 44, base 45, manual control stick 46, three control circuits 47 (as in FIG. 4), which are actuated by the manual control stick 46.

Figure 7:
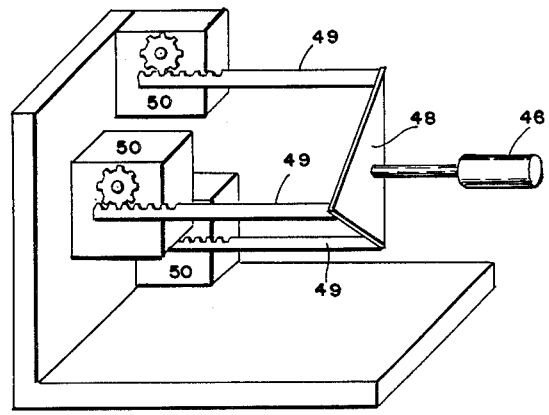
FIG. 7 illustrates the control mechanism of FIG. 6.

Referring to FIG. 7, I show the linkages, obvious to one skilled in the art, between the control stick 46 of FIG. 6 and the three control elements contained in 47 of FIG. 6. Any manually-produced motion of stick 46 is conveyed through plate 48 and racks 49 to control the positions of potentiometers 50, one of which is shown in FIG. 5. Changes in position of potentiometers 50 cause the transmission of electrical pulses to devices 43, which cause corresponding motions of motor bars 42. Thereby motions of motor bars 42 are so related to the motions of racks 49 as to result in a corresponding motion of tool 44.

FIGS. 8a–8d show alternative expansible elements employing respectively electro-magnetic, magnetostrictive, piezoelectric and thermal expansive means.

Figure 8A:
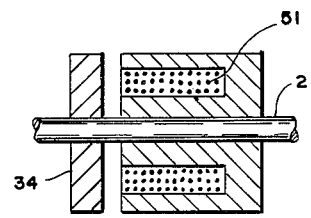
FIGS. 8a–8d illustrate the alternative electromagnetic, magnetostrictive piezoelectric and thermal expansible elements of my invention.
Figure 8B:
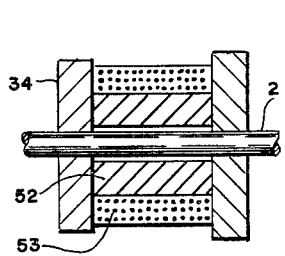
Figure 8C:
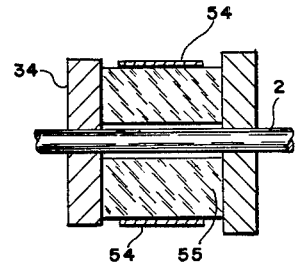
Figure 8D:
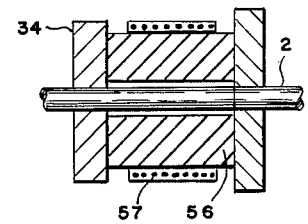

In each figure, 34 are movable coupling means, adapted to apply frictional forces to motor bars 2 through friction clutches not shown. In FIGURE 8a, coupler 34 is caused to move under the magnetic action of coil 51. In FIG. 8b coupler 34 is caused to move by the magnetostriction of nickel cylinder 52 in the magnetic field of coil 53. In FIG. 8c coupler 34 is caused to move by the piezoelectric action of crystal 55 in the field of electrodes 54, 54. In FIG. 8d coupler 34 is caused to move by the thermal expansion of cylinder 56 when heated by coil 57.

It will be apparent to those skilled in the art that even though the foregoing descriptions are restricted to three specific embodiments, which embodiments employ the magnetostrictive properties of certain materials, and of electromagnets, that my invention could equally be practiced by making use of thermal expansion, the piezoelectric effect, or the electrostrictive properties of certain materials, or of gross effects such as those of pneumatics or hydraulics.

The principles of my invention are sufficiently illustrated, but the embodiments shown, and their suggested applications should not be considered a limitation on the scope or spirit of my invention, as set forth in the appended claims.

I claim:

1. A device for producing precisely controlled motions by accumulation of incremental motions, comprising a rigid means, a rigid base, a multiplicity of expansible means secured to said base, each of said expansible means being constructed for incremental motion, coupling means including friction clutch means adjusted to apply frictional force of essentially constant magnitude between portions of said expansible means and said rigid means, and control means to cause said expansible means to expand and contract in a predetermined sequence of incremental motions.

2. A device for producing precisely controlled motions by accumulation of incremental motions, comprising a rigid movable means, a rigid base, a multiplicity of coupling means each independently movable with respect to said rigid movable means and each including friction clutch means adjusted to apply frictional forces of essentially constant magnitude to the said rigid movable means when so moving, a multiplicity of expansible means secured to said base and cooperating with said coupling means to cause said coupling means to move in incremental reciprocating motions with respect to said rigid base; control means constructed to cause said expansible means to expand and contract in a preassigned sequence of incremental motions.

3. A device for producing precisely controlled motions by accumulation of incremental motions, comprising a rigid base, a multiplicity of coupling means rigidly attached thereto, a movable means consisting of a multiplicity of expansible segments, said coupling means including friction clutch means adjusted to apply to the said movable means frictional forces of essentially constant magnitude, and control means arranged to cause incremental expansions and contractions of said expansible segments in a predetermined sequence of incremental motions.

4. The device of claim 1 wherein the said expansible means comprise magnetostrictive means and electromagnetic coils adapted to produce magnetic flux in said magnetostrictive means, and wherein the said control means is constructed to increase and decrease the electrical currents in said electromagnetic coils in sequential order.

5. The device of claim 2 wherein the said expansible means comprise magnetostrictive means and electromagnetic coils adapted to produce magnetic flux in said magnetostrictive means, and wherein the said control means is constructed to increase and decrease the electrical current in said electromagnetic coils in a predetermined sequence.

6. The device of claim 3 wherein the said expansible segments comprise magnetostrictive means and electromagnetic coils adapted to produce magnetic flux in said magnetostrictive means, and wherein the said control means is constructed to increase and decrease electrical currents in said electromagnetic coils in a predetermined sequence.

7. The device of claim 2 wherein the said expansible means comprise bimetallic magnetostrictive bars, one end of each of said bimetallic bars being rigidly attached to said rigid base, and electromagnetic coils adapted to induce a magnetic flux in said bimetallic bars; and wherein said control means is constructed to control sequentially the increase and decrease of electrical currents in said electromagnetic coils.

8. The device of claim 1 wherein said expansible means comprise thermally expansible material and controllable heating means adapted to heat the said thermally expansible material and thereby produce expansion, and wherein the said control means is constructed to cause the said heating means to emit heat sequentially to said thermally expansible material.

9. The device of claim 2 wherein said expansible means comprise thermally expansible material and controllable heating means adapted to heat the said thermally expansible material and thereby produce expansion, and wherein the said control means is constructed to cause the said heating means to emit heat sequentially to said thermally expansible material.

10. The device of claim 3 wherein said expansible segments comprise thermally expansible material and controllable heating means adapted to heat the said thermally expansible material and thereby produce expansion, and wherein the said control means is constructed to cause the said heating means to emit heat sequentially to said thermally expansible material.

11. The device of claim 1 wherein said expansible means comprise piezoelectric units and wherein said control means is adapted to apply sequentially to said piezoelectric units varying electrical potentials.

12. The device of claim 2 wherein said expansible means comprise piezoelectric units and wherein said control means is adapted to apply sequentially to said piezoelectric units varying electrical potentials.

13. The device of claim 3 wherein said expansible segmens comprise piezoelectric units and wherein said control means is adapted to apply sequentially to said piezoelectric units varying electrical potentials.

14. The device of claim 1 wherein each of said expansible means comprises in combination an electromagnet, an armature and elastic means acting on said armature, and wherein the said control means is constructed to cause the electromagnets of said expansible means and the said elastic means to coact to cause incremental motions of the armatures of said expansible means in a predetermined sequence.

15. The device of claim 2 wherein each of said expansible means comprises in combination an electromagnet, an armature and elastic means acting on said armature, and wherein the said control means is constructed to cause the electromagnets of said expansible means and the said elastic means to coact to cause incremental motions of the armatures of said expansible means in a predetermined sequence.

16. The device of claim 3 wherein each of said expansible segments comprises in combination an electromagnet, an armature and elastic means acting on said armature, and wherein the said control means is constructed to cause the electromagnets of said expansible segments and the said elastic means to coact to cause incremental motions of the armatures of said expansible segments in a predetermined sequence.

References Cited in the file of this patent

UNITED STATES PATENTS

| | | |
|---|---|---|
| 2,752,546 | Frisch | June 26, 1956 |
| 2,831,990 | Young | Apr. 22, 1958 |
| 2,843,974 | Butterworth et al. | July 22, 1958 |
| 2,843,976 | Silver | July 22, 1958 |
| 2,911,766 | Jones | Nov. 10, 1959 |